Aug. 20, 1968  J. W. RYAN ET AL  3,397,484
SOUND AND OPTICAL EFFECTS TOY
Filed Oct. 22, 1965  6 Sheets-Sheet 1
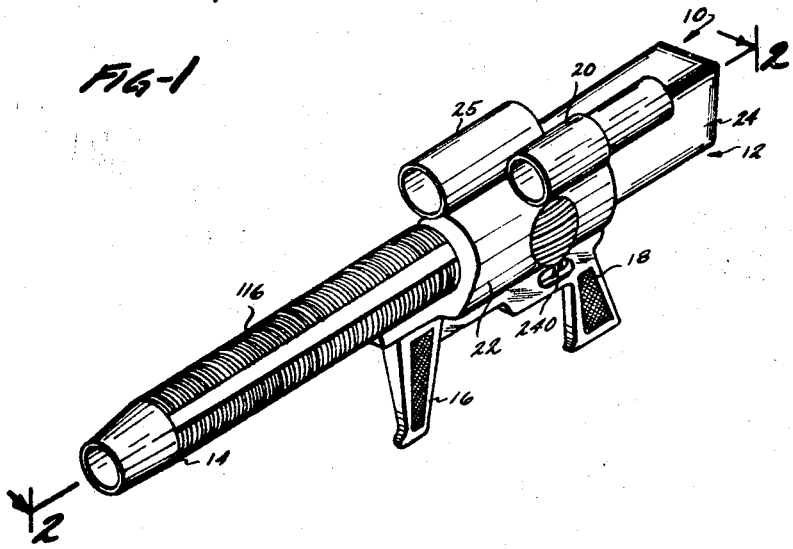
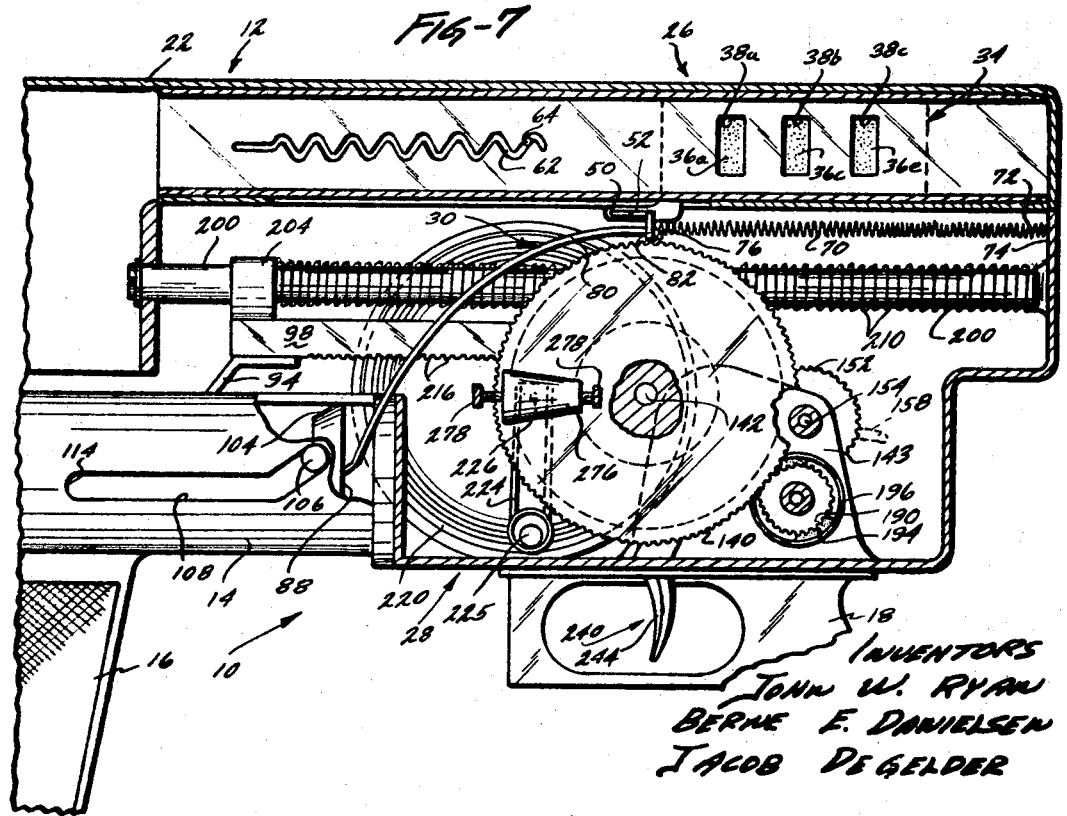
INVENTORS
JOHN W. RYAN
BERNE E. DANIELSEN
JACOB DE GELDER
BY Herzig, Walsh & Blackham
ATTORNEYS

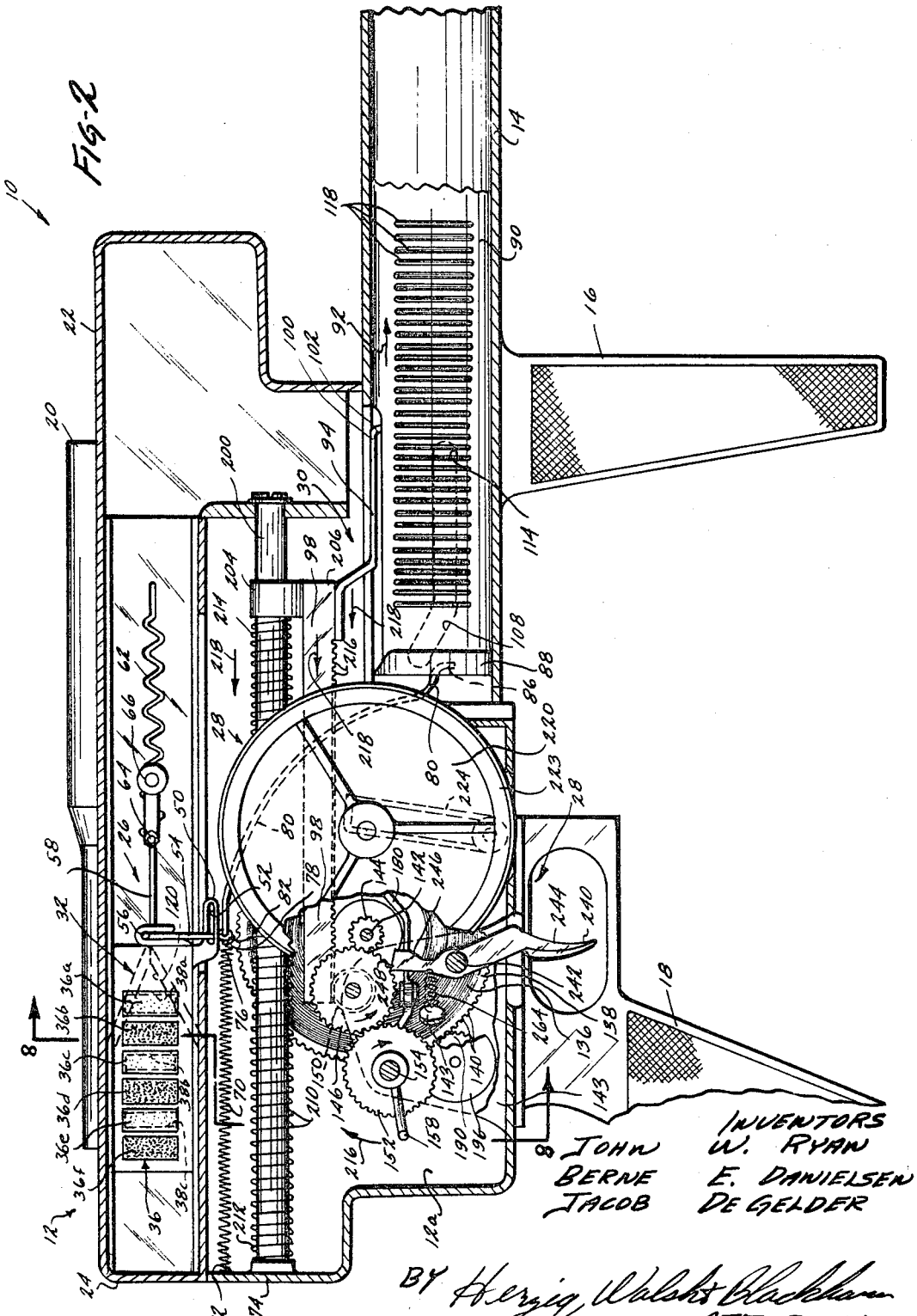

Aug. 20, 1968  J. W. RYAN ET AL  3,397,484
SOUND AND OPTICAL EFFECTS TOY
Filed Oct. 22, 1965  6 Sheets-Sheet 3
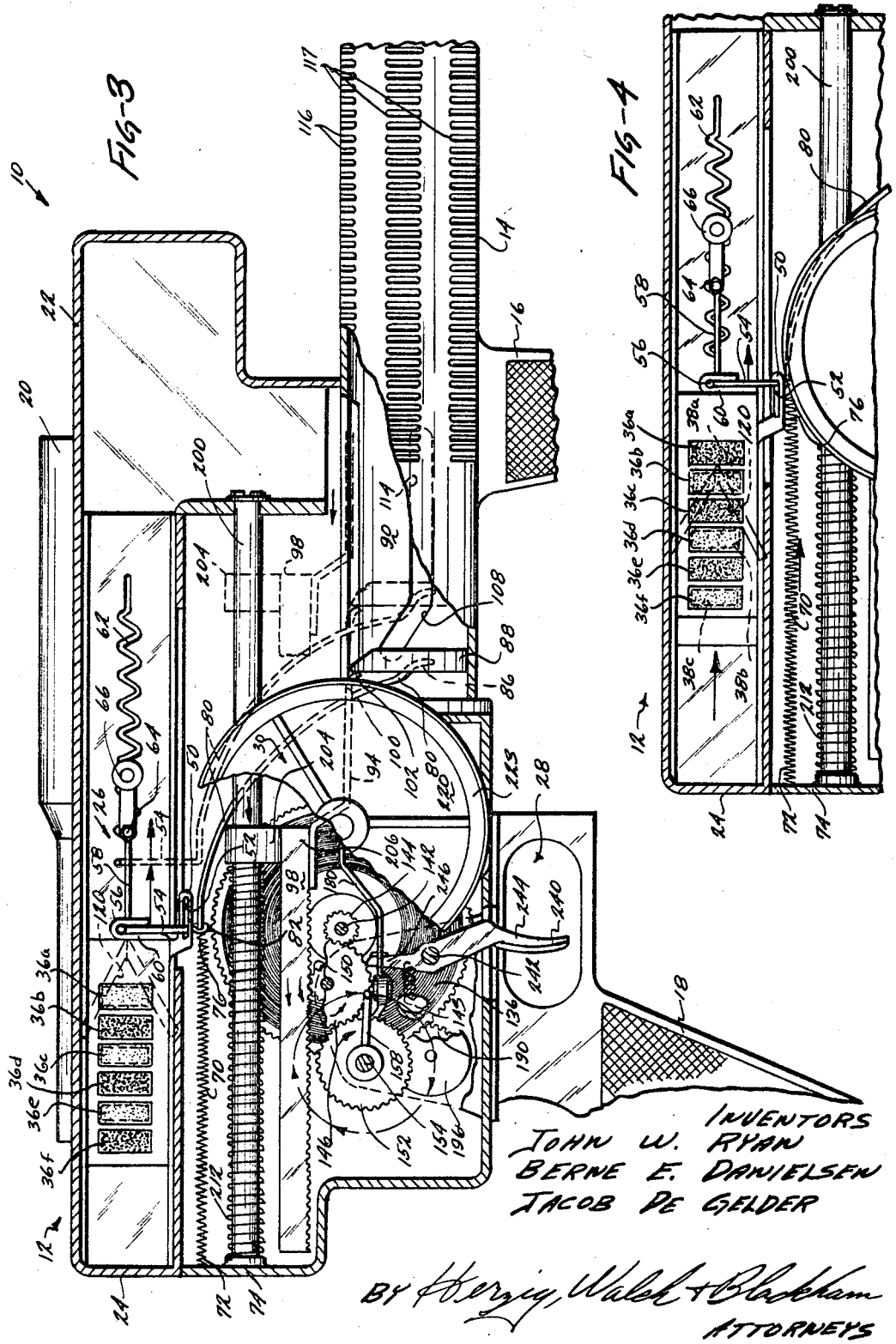
INVENTORS
JOHN W. RYAN
BERNE E. DANIELSEN
JACOB DE GELDER
BY Herzig, Walsh & Blackham
ATTORNEYS

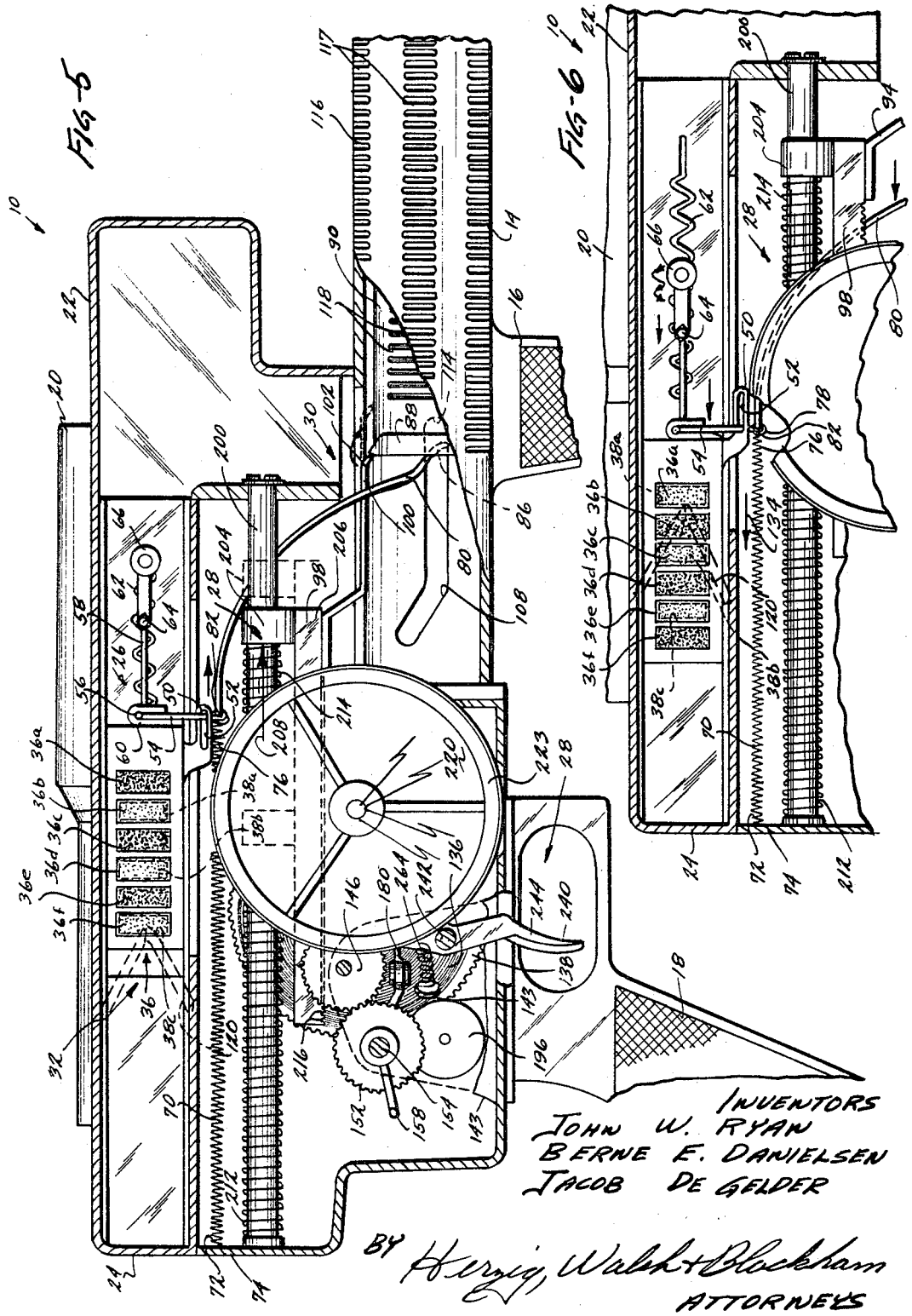

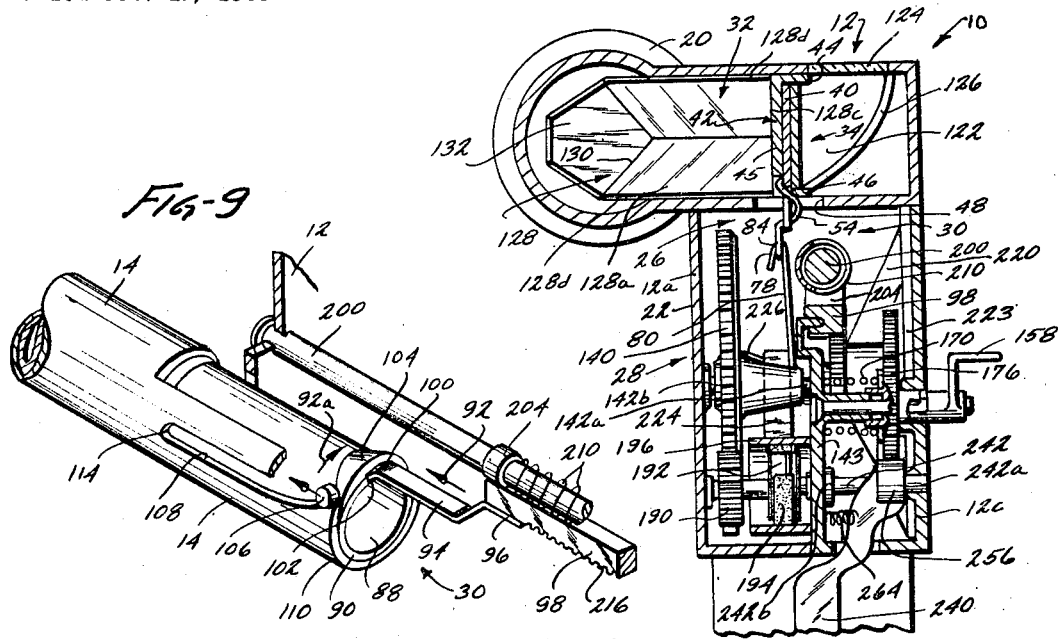
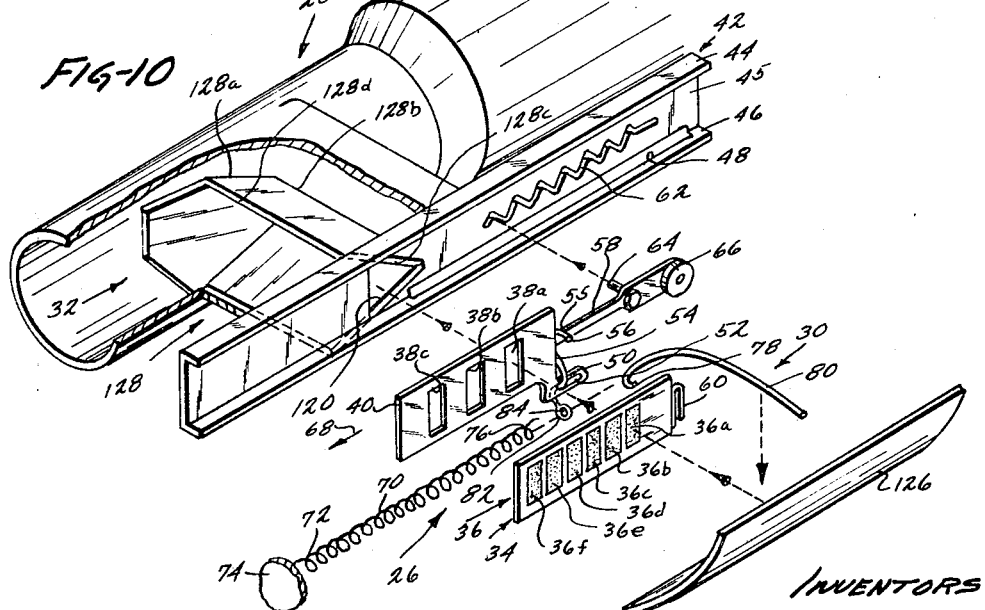

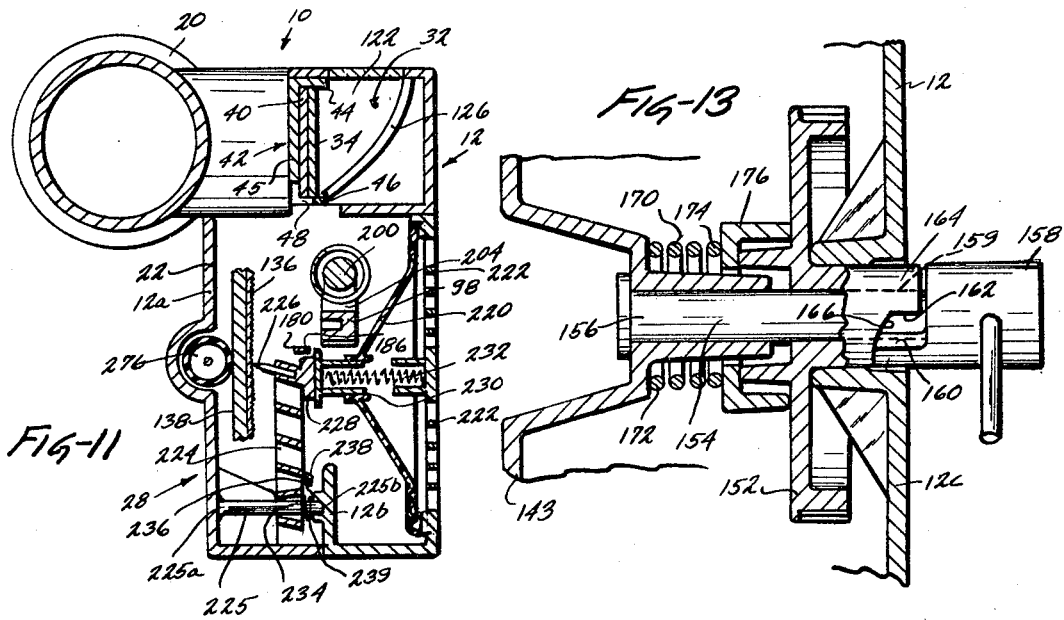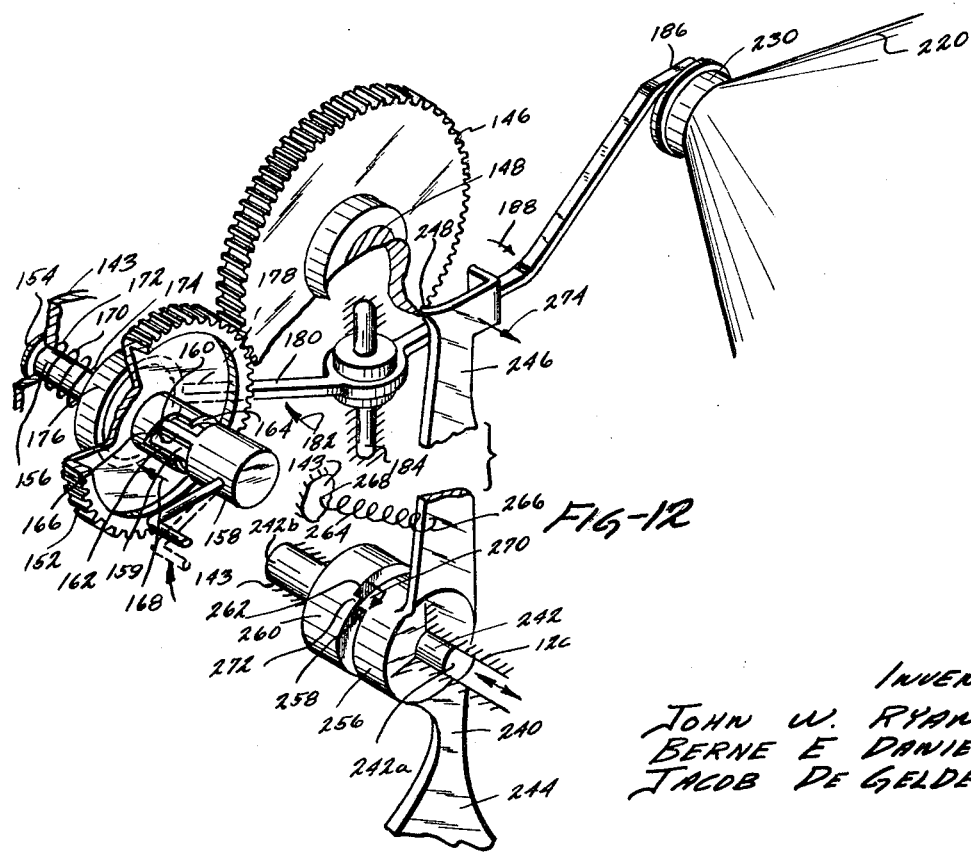

United States Patent Office 3,397,484
Patented Aug. 20, 1968

3,397,484
SOUND AND OPTICAL EFFECTS TOY
John W. Ryan, Bel-Air, Berne E. Danielsen, Pacific Palisades, and Jacob De Gelder, Hawthorne, Calif., assignors to Mattel, Inc., Hawthorne, Calif., a corporation of California
Filed Oct. 22, 1965, Ser. No. 501,531
16 Claims. (Cl. 46—175)

ABSTRACT OF THE DISCLOSURE

A toy gun having a simulated telescopic sight through which a remote target can be viewed through a "half silvered" mirror set at an angle in the line of sight. A film strip in the toy gun is moved so as to cause successive images thereon to be reflected by a V-shaped mirror onto the half silvered mirror. Sound producing means operate synchronously with the film strip to reinforce the psychological effect of the successive images, and a trigger is effective to start a cycle of operation at the will of the user.

---

The present invention relates to a new and useful sound and optical effects toy and more particularly to such a toy which superimposes a visual display on a real scene while producing a sound characteristic of the visual display. The present invention will be described for purposes of illustration, but not of limitation, as taking the form of a simulated gun; however, it is to be understood that the principles of the present invention apply equally well to a number of other types of toys.

A number of toys are available for placing a child-user in a simulated world of real-life events by having the toy produce predetermined optical effects during use by the child-user.

Other toys are available for placing a child-user of the toys in a simulated real-life environment by producing predetermined sound effects when the toy is actuated.

However, neither sound effects toys nor optical effects toys employ visual effects to produce a psychological effect by superimposing a visual display on a real scene and then reinforce the psychological effect by a sound to stimulate the imagination of the child-user.

Accordingly, it is the primary object of the present invention to provide a toy which combines sound and optical effects.

Another object of the present invention is to provide a toy having means for superimposing a visual display on a real scene while producing a sound characteristic of the visual display.

Yet another object of the present invention is to provide a new and useful toy simulating a gun which includes means for producing sound and optical effects characteristic of ray guns or shell-firing weapons, depending on the imagination of the child using the toy, and means for superimposing a predetermined visual display on a real scene at which the gun is aimed.

A further object of the present invention is to provide a simulated gun having a programming means for programming a visual display to produce the illusion that an object at which the gun is aimed absorbs harmful rays until it bursts, sound producing means for producing sounds characteristic of this illusion and means connecting the sound producing means to the programming means for synchronizing the sounds with the visual display.

According to the present invention, a sound and optical effects toy is provided which includes housing means in which is mounted (1) a visual-display programming means for programming a predetermined visual display to produce a psychological effect simulating a predetermined real-life event which stimulates the imagination of a child-user of the toy, (2) sound producing means for producing sounds characteristic of the visual display so that the psychological effect is reinforced, (3) means connecting the sound producing means to the programming means for synchronizing the sounds with the visual display and (4) means for superimposing the visual display on a real scene, such as another child, at which the toy is aimed.

The housing means is shown and described herein for purposes of illustration, but not of limitation, as comprising a simulated gun. The gun includes a simulated telescopic sight or eye-piece means for aiming the gun at the real scene. A composite mirror is mounted in the eyepiece means in such a manner that a user of the gun can see the real scene through the mirror while simultaneously viewing the visual display which is reflected on the composite mirror.

The sound producing means includes phonograph means having a record on which the sounds are recorded. The gun also includes a trigger which actuates the connecting means when the trigger is pulled so that the phonograph record will be played in synchronism with the visual display.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

In the drawings:

FIGURE 1 is a perspective view of a sound and optical effects toy constituting a presently preferred embodiment of the invention;

FIGURE 2 is an enlarged, partial cross-sectional view, with parts broken away to show internal construction, taken along lines 2—2 of FIGURE 1 showing the gun-actuating mechanism at the end of an operating cycle;

FIGURE 3 is a partial cross-sectional view similar to FIGURE 2 showing the operating mechanism during one stage of the operation which conditions the gun for an operating cycle;

FIGURE 4 is a partial cross-sectional view similar to FIGURE 3 showing the relative location of a portion of the visual display means during an operating cycle;

FIGURE 5 is another partial cross-sectional view similar to FIGURE 3 showing the visual display means and the actuating means approaching the end of an operating cycle;

FIGURE 6 is a partial cross-sectional view similar to FIGURE 4 showing the relative position of portions of the visual display means during a return stroke thereof;

FIGURE 7 is a partial cross-sectional view similar to FIGURE 2 showing the opposite side of the gun from that shown in FIGURE 2;

FIGURE 8 is a cross-sectional view taken along line 8—8 of FIGURE 2;

FIGURE 9 is an enlarged, partial perspective view showing certain details of construction of the gun of FIGURE 1;

FIGURE 10 is an enlarged, exploded perspective view of the eye-piece and visual display means of the gun of FIGURE 1;

FIGURE 11 is an enlarged, partial cross-sectional view similar to FIGURE 8, but taken through a different plane;

FIGURE 12 is an enlarged, perspective view showing somewhat schematically the relationship between the winding mechanism, drive gear, speaker cone and trigger of the gun shown in FIGURE 1; and FIGURE 13 is an enlarged, cross-sectional view of the winding mechanism shown in FIGURE 12.

Referring again to the drawings and particularly to FIGURE 1, a sound and optical effects toy constituting a presently preferred embodiment of the invention, generally designated 10, includes housing means 12 which is shown, for purposes of illustration but not of limitation, in the form of a simulated gun.

The housing means 12 includes a barrel portion 14, a front hand grip portion 16, a rear hand grip portion 18, a simulated telescopic sight or eye-piece means 20, a front housing portion 22, a rear housing portion 24 and a cylindrical ornament 25.

Referring to the remaining figures, mounted within the housing means 12 are a visual-display programming means 26, a sound producing means 28, connecting means 30 connecting the programming means 26 to the sound producing means 28 and superimposing means 32 (FIGURE 10) for superimposing a visual display on a real scene at which the toy 10 is aimed by viewing the real scene through the eye-piece means 20.

The programming means 26 includes a film carrier 34 to which is affixed a visual display 36 in the form of a plurality of predetermined arcuate color patterns 36a, 36b, 36c, 36d, 36e and 36f which, when displayed in a manner to be hereinafter described, form visual displays which produce different psychological effects on a child-user on the toy 10. For example, a child may imagine that shells are arriving at and bursting over a real scene viewed through the eye-piece means 20. On the other hand, the child may imagine that exotic rays, such as Laser rays are impinging upon the real scene until it becomes filled therewith and explodes. These psychological effects are reinforced by appropriate sounds which come from the sound producing means 28 during the viewing of the visual display. The color patterns 36a, 36c and 36e are arranged in a first predetermined set and the patterns 36b, 36d and 36f are arranged in a second predetermined set. The first set (36a, 36c and 36e) is adapted to be exposed by openings 38a, 38b and 38c respectively, which are provided in a masking plate 40 (FIGURE 10), during one portion of the operating cycle of the programming means 26 and the second set (36b, 36d and 36f) is adapted to be exposed by the associated openings 38a, 38b and 38c during another portion of the operating cycle of the programming means 26. The carrier 34 is placed on the masking plate 40 and the assembly thus formed is reciprocably mounted in a channel-shaped way 42 which includes an upper rail 44, a web 45 and a lower rail 46. The way 42 is mounted in the housing means 12 (FIGURES 8, 10 and 11) adjacent and parallel to the eye-piece means 20. The way 42 is provided with an elongated slot 48 at the junction of the web 45 and the lower rail 46 for the reception of a link carrier 50 which is provided on the masking plate 40. The carrier 50 is provided with an elongated slot 52 in which an S-shaped link 54 is reciprocably mounted. The link 54 includes an upper loop 56 which passes over a flexible rod or cantilever spring 58 and into operative engagement with a U-shaped hook 60 provided on the carrier 34 for reciprocating it within the way 42.

The programming means 26 also includes a serpentine-shaped, sine-wave slot 62 which is provided in the web 45 for the reception of a governor pin 64 carried by the flexible rod or spring 58. The spring 58 also carries a weight 66 which assures that the pin 64 will bottom-out at each low spot in the slot 62 thereby serving as a governor in the form of a spring-mass system running in a sine-wave slot for controlling the rate of travel of the plate 40 when it is pulled in the direction of arrow 68 by a spring 70 having one end 72 connected to an end wall 74 provided on the housing portion 22 and another end 76 connected to the hooked end 78 of a wire pull-rod 80 forming a portion of the programming means 26. The pull-rod 80 is threaded through an eyelet 82 provided on the lower loop 84 of link 54 and includes another end 86 which is affixed to an end wall 88 provided on a visual-display tube or tubular member 90. The end 86 is affixed to the wall 88 in such a manner that the tube 90 is free to reciprocate within the barrel 14 while rotating through an angle of approximately 30°.

The tube is slid within the barrel 14 in the direction of arrow 92 (FIGURE 9) by a portion of the connecting means 26 comprising a flexible push member 94 having one end 96 affixed to a spring-driven rack 98 and another end 100 which is provided with a tang 102 engageable with a plug or extension 104 provided on the end wall 88. The tube 90 is caused to rotate during its reciprocation within barrel 14 by a pin 106 which is engaged in an L-shaped slot 108 provided in the encompassing side wall 110 of the barrel 14. The pin 106 reaches the end 114 of slot 108 before the spring-driven rack 98 reaches the end of its stroke in the direction of arrow 92. This stops the tube 90 causing the tang 102 to be deflected upwardly over the plug 104, as indicated in broken lines in FIGURE 5. The barrel 14 is provided with a plurality of slots 116 which are arranged in spaced, parallel rows 117. The sliding and rotating tube 90 is provided with a plurality of red marks 118 which are one less in number than the slots 118 to produce the visual effect of gun flashes travelling along the barrel 14 when the marks 118 are seen through the slots 116 during reciprocation and rotation of the tube 90 in the direction of arrow 92.

During movement of the tube 90 in the direction of arrow 92 by the member 94, the pull rod 80 draws the link 54 in the direction of arrow 92 against the resistance of spring 70. The link 54 immediately moves the carrier 34 in the direction of arrow 92. However, the plate 40 does not start moving immediately because the link 54 has to move within slot 52 from the position shown in FIGURE 6 to the position shown in FIGURE 5 before the plate 40 will be moved by the link 54. Thus, the colored patterns 36a, 36c and 36e move past their associated windows 38a, 38b and 38c bringing the patterns 36b, 36d and 38f into position within the windows 38a, 38b and 38c, respectively. The carrier 34 and plate 40 then move together drawing the color patterns 36b, 36d and 36f sequentially past a V-shaped opening 120 provided in the web 45. A light chamber 122 (FIGURES 8 and 11) is provided in the housing means subjacent a diffuser 124 which takes light from a 180° arc and makes it white. A curved mirror 126 is mounted in chamber 122 subjacent diffuser 124 in alignment with the opening 120. The mirror 126 is curved as shown in FIGURE 8 so that it will fit within chamber 122 and still reflect the light received through diffuser 124 at a proper angle with respect to the opening 120. This reflected light passes through the color patterns and opening 120 and onto a V-shaped mirror 128 which is mounted in the housing means 12 in such a manner that one end 130 thereof extends into the eye-piece means 20 where it is joined to a semi-transparent mirror means 132. The semi-transparent mirror means 132 is a device which is sometimes referred to as a "half-silvered mirror" or a "partially-transmitting mirror." Such mirrors transmit a comparatively small percentage of light while reflecting a comparatively large percentage. One method of making these mirrors is to employ vacuum coating techniques to deposit aluminum particles on a transparent foundation leaving sufficient space between particles that a predetermined amount of light will pass through the foundation between particles while the majority of the light is reflected by the particles. It has been found that a clear acetate foundation having aluminum particles deposited thereon in such a manner that the mirror transmits 20% of the light to which it is subjected while reflecting 80% is satisfactory for the mirror means 132. The mirror means 132, which is referred to herein sometimes for convenience as a "composite mirror," is arranged in the toy 10 in such a manner that a person peering into the eye-piece means 20 will simultaneously view a real scene, such as another person, at which the toy 10 is aimed and the reflection from the V-shaped mirror 128. Thus, the visual display 36 is superimposed on the real scene by the mirrors 128 and 132. Since the color patterns 36*b*, 36*d* and 36*f* are moving past the opening 120 from the extended arms 128*a* of mirror 128 to its apex 128*b*, the reflection of the arcuate shape of the color patterns creates the illusion that colored rays are leaving the toy 10 and are converging on the real scene. The flashing of the marks 118 in slots 116 is coordinated with this illusion. The arms 128*a* form an angle of approximately 60° with each other and the edge 128*c* of each arm 128*a* (FIGURES 8 and 10) forms an angle of 90° with its associated edge 128*d*. With this arrangement, the rays are nearly circular. Other shapes may be obtained by changing the angle between the edges 128*c* and 128*d*, as will be apparent to those skilled in the art.

When the tang 102 is deflected to its FIGURE 5 broken-line position, the force stored in spring 70 will draw wire 80 in the direction of arrow 134 (FIGURE 6) causing the carrier 34 to move in the direction of arrow 134 until the patterns 36*a*, 36*c* and 36*e* are positioned in the windows 38*a*, 38*b* and 38*c*, respectively. The link 54 then bottoms out in slot 52 causing the plate 40 to also move with the carrier 34 in the direction of arrow 134. Since the arcuate patterns 36*a*, 36*c* and 36*e* move sequentially past the opening 120 from the apex 128*b* to the extended arms 128*a*, the patterns appear to move away from the real scene giving the illusion that the real scene is being blown up.

Thus, the programming means 26 programs predetermined visual displays 36 and 118 to produce the psychological effect of rays or shells leaving the toy 10, converging on a real scene and causing the real scene to be blown up thereby. This psychological effect is reinforced by suitable sounds which are produced by the sound producing means 28. The operation of the means 28 is synchronized with the visual displays by the connecting means 30.

The sound producing means 28 includes a phonograph record 136 on which the sounds are recorded by conventional hill-and-dale recording methods. The record 136 is mounted on a turntable 138 having gear-teeth 140 provided about its periphery. The turntable 138 is affixed to a shaft 142 having one end 142*a* (FIGURE 8) rotatably mounted on a partition 143 provided in the housing means 12 and another end 142*b* rotatably mounted in a sidewall portion 12*a* of housing means 12. The shaft 142 carries a first pinion gear 144 for imparting rotation thereto. The pinion gear 144 meshes with a drive gear 146 which is rotatably mounted in the housing means 12 on a shaft 148 and which is driven by the rack 98 through a second pinion gear 150 affixed to the gear 146. The gear 146 meshes with a crank gear 152 which is rotatably mounted on a shaft 154 having an end 156 rotatably mounted in the partition 143, as shown in FIGURE 12. A crank 158 is secured to the other end 159 of shaft 154 for imparting rotation thereto. The crank 158 carries a spline 160 which rotates the crank gear 152 by seating in a slot 162 provided in a hub 164 which is affixed to the crank gear 152. The slot 162 includes an end 166 which is provided with a sloping surface so that, during the first movement of crank 158 within the slot 162, the spline 160 will ride up the sloping surface causing the crank gear 152 to move axially in the direction of arrow 168 against the resistance of a spring 170 which encompasses the shaft 154. The spring 170 has one end 172 bearing against the partition 143 and another end 174 bearing against an annular member 176 which is in contact with the gear 152. During this movement, the crank gear 152 moves the annular member 176 which is provided on one end 178 of a reset lever 180. This swings the lever 180 in the direction of arrow 182 about a pivot pin 184 on which the lever 180 is rotatably mounted intermediate the end 178 and its other end 186. As the end 178 swings in the direction of arrow 182, the end 186 swings in the direction of arrow 188 for a purpose to be hereinafter described. The gear teeth 140 on turntable 138 mesh with a governor-driving gear 190 which controls the operation of a governor 192 having weights 194 provided in a housing 196 (FIGURE 7) to hold the turntable 138 to a proper angular velocity for the playing of the record 136.

The rack 98 is slidably connected to a fixed rod 200 by a ring or collar 204 which encompasses the rod 200 and which is connected to one end 206 of the rack 98. The rack 98 is driven in the direction of arrow 208 (FIGURE 5) by a rack-driving, power spring 210 which encompasses the rod 200 and which has one end 212 bearing against the end wall 74 and another end 214 bearing against the ring or collar 204. The rack 98 is provided with a plurality of teeth 216 which engage the pinion 150 for operation thereby. When the crank gear 152 is rotated in the direction of arrow 216 (FIGURE 2) by crank 158, the crank gear 152 rotates the drive gear 146 and the attached pinion gear 150 in a counterclockwise direction, as viewed in FIGURE 2, driving the rack 98 to the left in the direction of arrow 218 compressing the spring 210 and storing sufficient energy therein to drive the rack 98 through its operating cycle in the direction of arrow 208 (FIGURE 5) causing the sound producing means 28 to operate in synchronism with the visual display means 36 and 118.

The sound producing means 28 also includes a speaker cone 220 which is mounted in the housing means 12 adjacent a speaker grill 222 (FIGURE 11). The cone 220 is retained in the housing means 12 by a frame 223 and transmits recorded sounds to a user of the toy 10 when the speaker cone 220 is suitably excited by a tone arm 224 swingably mounted in the housing 12 on a post 225 having one end 225*a* affixed to wall 12*a* and another end 225*b* affixed to a partition 12*b*. The tone arm 224 carries a phonograph needle 226 which is engageable with the record 136 and a transverse bar 228 which is engageable with a cylindrical member 230 slidably mounted in the speaker cone 220. The member 230 is biased into engagement with the bar 228 by a spring 232. The cylindrical member 230 may be brought out of engagement with the tone arm 224 by the end 186 of the lever 180 when it is swung in the direction of arrow 188 (FIGURE 12) by the sliding of the crank gear 152 during the movement of crank 158 from its dotted line position to its solid line position. The tone arm 224 then automatically rises and returns to the edge of the record 136 at the beginning of the recorded message under the influence of a return spring 234 which encompasses the post 225 with one end 236 engaging a clip 238 provided on the tone arm 224 and another end 239 engaging partition 12*b*.

The turntable 138 is prevented from rotating when the spring 210 is compressed by a trigger 240 which is swingably mounted on a pin 242 having one end 242*a* affixed to a sidewall portion 12*c* of housing means 12 and another end 242*b* affixed to the partition 143 (FIGURE 8). The trigger 240 includes an end 244 forming a finger-engaging portion and an end 246 which is provided with a detent 248 normally engaging the drive gear 146 to prevent rotation thereof. The trigger 240 also includes a hub portion 256 having a detent 258 (FIGURE 12) provided thereon. The end 242*b* of the shaft 242 carries a similar hub 260 and a detent 262 which coacts with the detent 258 in two different operating modes. In both modes, a trigger spring 264, which has one end 266 connected to the trigger 240 intermediate the hub 256 and end 246 and another end 268 connected to the partition 143, normally biases the trigger 240 both in a counterclockwise direction, as viewed in FIGURE 12, and axially along shaft 242 toward partition 143. The spring 264 assures that the trigger detent 248 will ratchet on the teeth of gear 146 during the operation of crank 158, and maintains a raised face 270 on hub 256 in contact with a raised face 272 on hub 260 until the trigger 240 is swung in a clockwise direction away from its FIGURE 12 position to release the trigger 248 from the gear 146. When the trigger 240 is so swung, the face 270 moves past the face 272 so that the spring 264 will move the trigger 240 axially toward partition 143 until the detent 258 locks against the detent 262 so that the trigger detent 248 will remain out of engagement with gear 146 even though the actuating pressure be released from trigger 240. The detents 258 and 262 are brought back to their FIGURE 12 position when the reset lever 180 is swung upon actuation of the crank 158 to move gear 152 axially in the direction of arrow 168, as previously described. The lever 180 then moves the trigger detent 248 in the direction of arrow 274 thereby sliding the trigger 240 axially on the shaft 242 away from partition 143 to provide clearance between the detents 258 and 262 whereupon the spring 264 swings the trigger 240 in a counterclockwise direction sufficiently to cause the face 270 to contact the face 272.

Referring now to FIGURES 7 and 11, a frusto-conical roller 276 is rotatably mounted on a pair of brackets 278 which extend from the sidewall portion 12a of housing means 12. The roller 276 supports the turntable 138 along an arcuate path defined by the needle 226 to absorb the presure exerted on the record 136 and the turntable 138 by needle 226. This is an important feature of the present invention because it permits making the record 136 and the turntable 138 from light, inexpensive, flexible materials which would otherwise become deformed by the pressure exerted thereon by the needle 226.

Operation of the device will be readily understood. Referring to FIGURE 2, the operating parts are at rest following an operating cycle. The rack-driving power spring 210 is at its installed load of approximately 13.25 pounds; the rack 98 is in its forward position; the trigger detent 258 is seated against detent 262 holding trigger detent 248 away from gear 146; the visual display tube 90 has been withdrawn or retracted by the spring 70 which is at its installed load; the link 54 has been drawn to the rear of slot 52 by spring 70; the reset lever 180 has been moved to its inactive position by the spring 170; and the tone arm 224 remains in contact with record 136 at the end of its recorded message. Thus, the toy 10 is in condition to receive a "wind-up cycle" to condition it for its next operating sequence. The wind-up cycle is commenced by grasping the crank 158 and rotating it in a clockwise direction, as viewed in FIGURE 2. Rotation of the crank 158 through approximately 1/12 of a turn from its FIGURE 12 broken line position to its solid line position causes the spline 160 to move from the low spot to the high spot on surface 166 moving the crank gear 152 axially in the direction of arrow 168 (FIGURE 12) approximately 1/16-inch against the bias of spring 170. Movement of the gear 152 axially pivots the reset lever 180 in a clockwise direction lifting the cylindrical member 230 off the tone arm 224 permitting spring 234 to lift the needle 226 from the end of the record 136 and swing the tone arm into position at the beginning of the record 136. Pivoting of the reset lever 180 also moves the trigger 240 axially in the direction of arrow 274 sufficiently to disengage detent 258 from detent 262 so that spring 264 will return the trigger 240 to its FIGURE 12 position where the trigger detent 248 engages the teeth on the gear 146.

After 1/12 of a turn, the spline 160 engages the hub 164 imparting rotation to the gear 152 in a clockwise direction. This rotates the drive gear 146 and its associated pinion gear 150 in a counterclockwise direction causing the rack 98 to move rearwardly in the direction of arrow 218 loading the power spring 210. The drive gear 146 also rotates the turntable gear 144 in a clockwise direction causing the turntable to rotate backwards while engaging the governor gear 190 rotating the governor backwards.

Continued rotation of the crank 158 in a clockwise direction moves the parts to the relative position shown in FIGURE 3 where the tang 102 on arm 94 flexes into position behind the extension 104 on the tube 90 and the power spring 210 becomes fully compressed and loaded to approximately 20 pounds. The crank 158 may then be released permitting the trigger detent 248 to retain the load in spring 210 and also permitting the spring 170 to pivot the reset lever 180 in such a manner that the cylindrical member 230 is released whereupon the spring 232 biases the needle 226 into engagement with the record 136. The toy 10 is now in condition for an operating cycle.

Referring now to FIGURES 3–6 and 12, the operating cycle is commenced by squeezing trigger 240 to swing it in a clockwise direction, as viewed in FIGURE 12, whereupon the detent 258 engages the detent 262 to maintain the trigger detent 248 released from the drive gear 146. The power spring 210 then moves the rack 98 forwardly in the direction of arrow 208 exerting a force on tube 90 through tang 102 to move tube 90 in the direction of arrow 92. This movement causes pull wire 80 to draw link 54 in the direction of arrow 92 moving film carrier 34 one frame to the right, as viewed in FIGURE 3, positioning the patterns 36b, 36d and 36f of the visual display 36 in windows 38a, 38b and 38c, respectively, on the plate 40 while the loop 84 of link 54 is moving one frame width within the slot 52 from the position shown in FIGURE 3 to the position shown in FIGURES 4 and 5. Forward movement of the rack 98 also imparts forward rotation to the turntable 138 through pinion 150 and drive gear 146 whereupon the record 136 actuates the needle 226 and the speaker cone 220 to emit the sound recorded on the record 136. Forward rotation of the turntable 138 also rotates the governor 192 to control the speed of the turntable 138.

As the tube 90 and the carrier 34 start forward, the pin 106 (FIGURE 9) moves down L-shaped slot 108 causing the tube 90 to revolve in the direction of arrow 92a exhibiting the visual display 118 through slots 116 in barrel 14 in simulation of red rays or gun flashes. Simultaneously, the pattern 36b has reached the opening 120 so that the visual display will be reflected by the widely separated arms 128a of mirror 128 onto the mirror 132 where it is exhibited to the user of the toy 10 through the eye-piece means 20 in the form of a large circular pattern. After 0.56 second of operation, the rack 98 has been displaced 1/2-inch and the tube 90 has revolved approximately 15 degrees. The power spring 210 still has a load of approximately 19.25 pounds. At this point, the first pattern 36b has just passed the apex 128b of mirror 128 after its reflection progressively diminished to a very small circular pattern while moving from the wide part of arms 128a to the apex 128b. Also, the pattern 36d begins to appear in opening 120.

After the toy 10 has been operating approximately 1.11 seconds, the rack has been displaced 1.0-inch and the pattern 36d is in the middle of opening 120. Also, the tube 90 has rotated its visual display 118 approximately 30 degrees and the power spring 210 has a load of approximately 18.5 pounds.

After about 1.67 seconds of operation, the rack 98 has been displaced 1.5-inches and the pattern 36d has passed beyond opening 120 while the pattern 36f enters opening 120. The turntable 138 has now rotated record 136 approximately 6.1 revolutions and the power spring 210 has a load of approximately 17.75 pounds.

After approximately 2.22 seconds of operation, the rack 98 has been displaced 2-inches and the pattern 36f is in the middle of opening 120. The record 136 has now completed 8.12 revolutions and the power spring load is approximately 17.0 pounds.

After approximately 2.8 seconds, the rack 98 has been displaced 2.5-inches and the pattern 36f passes from view in opening 120. The record 136 has now completed 10.15 revolutions and the power spring load is approximately 16.25 pounds.

After approximately 3.3 seconds of operation the rack 98 has been displaced 3.0-inches and the photograph record 136 has completed 12.18 revolutions while the power spring load has diminished to 15.5 pounds. After approximately 3.93 seconds of operation, the rack 98 displacement is 3.5-inches at which point the pin 106 seats at end 114 of slot 108 so that the tang 102 is deflected upwardly to its FIGURE 5 broken line position. This releases the tube 90 from the rack 98 whereupon the force in spring 70 becomes effective to reverse the direction of movement of the tube 90 and the carrier 34. At this point, the record 136 has completed 14.21 revolutions and the power spring load is approximately 14.75 pounds.

After the spring 70 has retracted the tube 90 and the carrier 34 ½ inch, the link 54 reaches the end of its travel in slot 52 positioning the patterns 36a, 36c and 36e in the openings 38a, 38b and 38f, respectively, and picking up the plate 40 for movement with the carrier 34. The pattern 36e comes into view at this point and travels ½ inch to the mid-point of the opening 120 giving the visual impression that the real scene is exploding because the arcuate pattern is reflected by the apex 128b as a small circular image which grows in size as the pattern 36e is reflected by the diverging arms 128a. After 4.94 seconds of operation, the rack 98 has been displaced 4.0 inches and the tube 90 together with the plate 40 and carrier 34 have been retracted approximately 2 inches. The pattern 36c is then at mid-point in the opening 120, giving the visual impression that a second "explosion ring" has risen from the real scene.

After operating for 4.77 seconds, the rack 98 has been displaced 4.25 inches and the tube 90 and the carrier 34 have retracted approximately 2.75 inches. The pattern 36a is then approximately two-thirds of the way down the opening 120, giving the visual impression that a third "explosion ring" has risen from the real scene. The record 136 has now completed 17.76 revolutions and tube 90 has revolved 7.5 degrees toward its "off" position wherein the visual display 118 is hidden from view through the slots 116. The power spring load is now approximately 13.67 pounds.

After approximately 5.0 seconds, the rack 98 has reached the end of its travel, the pin 106 on tube 90 has reached the upper end of slot 108 and the governor pin 64 on spring 58 has reached the end of its travel in slot 62. This stops the carrier 34 with the pattern 36a at the approximate position shown in FIGURE 3.

The spring-mass system, defined by the spring 58, the weight 66 and the pin 64, coacts with the sine-wave slot 62 to slow the rate of return travel of the plate 40 under the influence of spring 70 from a theoretically instantaneous return to a rate of approximately 4 inches per second so that movement of the visual display 34 is synchronized with the playing of the phonograph record 136.

It will be clear from the foregoing that the arcuate color patterns 36b, 36d and 36f, in moving from their FIGURE 3 position to their FIGURE 5 position, each start out as a large circular pattern due to their reflection from the wide part of the divergent arms 128a. Since each arcuate pattern is drawn toward the apex 128b, this circular pattern diminishes in size and becomes very small when reflected by the apex 128b. Since the real scene is at a distance from the composite mirror 132, and since both the diminishing circular patterns and the real scene are visible in the mirror 132, the illusion is created that the circular patterns travel from the toy 10 to the real scene during the movement of carrier 34 from its FIGURE 3 position to its FIGURE 5 position. This may create the psychological effect on a child-user that exotic rays, such as laser rays, are leaving the toy 10 and striking the real scene. On the other hand, the child-user may imagine that shells are being fired at the real scene by the toy 10.

The arcuate patterns 36a, 36c and 36e have a wavy, bumpy peripheral edge. During return movement of the carrier 34 from a position comparable to that shown in FIGURE 5 to a position such as that shown in FIGURE 3, each of these patterns is first reflected by the apex 128b as a very small, irregular circular pattern which increases in size as the reflection of the pattern moves from the apex 128b to the widest part of divergent arms 128a. This creates the illusion that the irregular, circular patterns are rising from the real scene. This may create the psychological effect on a child-user that the real scene has absorbed enough exotic rays to cause the real scene to explode. On the other hand, the child-user may imagine that shells from the toy 10 are exploding on the real scene.

The aforementioned psychological effects are reinforced by the sounds produced by the sound producing means 28. This is accomplished by recording predetermined sounds on record 136 in such a manner that, when the operation of the sound producing means 28 is synchronized with the operation of the visual display programming means 26 in the manner described above in detail, an underlying mechanical sound having a vibrational "whooing" overtone will rise somewhat in pitch and reach a crescendo as the reflection of each of the patterns 36b, 36d and 36f moves from the widest part of arms 128a to the apex 128b during the forward travel of carrier 34 (in the direction of arrow 92, as shown in FIGURE 5). When the carrier 34 reaches the end of this forward travel, the record 136 has completed 14.21 revolutions. This marks the beginning of a crash sound which lasts until the pattern 36e comes into view. At this time, the record 136 reproduces a recorded mechanical sound having a quick Doppler reversal which decreases in intensity as the reflection of each of the patterns 36e, 36c and 36a moves from the apex 128b to the widest part of the arms 128a.

As used herein, the phrase "real scene" means any object or visible representation at which the toy 10 is aimed and which is visible through the composite mirror means 132.

While the particular sound and optical effects toy herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. A sound and optical effects toy, comprising:
   visual-display means for producing a predetermined visual display producing a psychological effect on a user of said toy which simulates a predetermined real-life event, thereby simulating the imagination of said user;
   sound producing means for producing a sound characteristic of said visual display, wherein said psychological effect is reinforced;
   means defining an optical path for directly viewing an actual scene remote from said toy; and
   means for presenting said visual display in said optical path to appear superimposed on the image of an actual scene, toward which said optical path is aimed.

2. A sound and optical effects toy, comprising:
   housing means;
   visual-display programming means mounted in said housing means for programming a predetermined changeable visual display to produce a psychological effect simulating a predetermined event which stimulates the imagination of a child-user of said toy;
   sound producing means mounted in said housing means for producing sound characteristic of said visual display, whereby said psychological effect is reinforced;
   means connecting said sound producing means to said programming means for synchronizing said sound with said visual display;
   means defining an optical path for directly viewing an actual scene remote from said toy; and
   means for presenting said visual display in said optical path to appear superimposed on the image of an actual scene, toward which said optical path is aimed.

3. A toy as stated in claim 2 wherein said superimposing means includes eye-piece means for aiming said optical path at said actual scene and composite mirror means mounted in said eye-piece means for exhibiting said visual display to a user of said eye-piece means while simultaneously permitting said user to have an unobstructed view of said real scene.

4. A toy as stated in claim 2 wherein said housing means is shaped to simulate a gun.

5. A device as stated in claim 2 wherein said sound producing means includes means for reproducing a mechanical sound having a vibrational overtone which builds up to a crescendo and wherein said programming means programs a visual display which appears to diminish in size when reflected by said superimposing means.

6. A toy as stated in claim 5 wherein said superimposing means includes V-shaped mirror means and wherein said programming means includes a film strip mounted in said housing means adjacent said V-shaped mirror means, whereby predetermined patterns carried by said film strip are reflected by said V-shaped mirror means onto said composite mirror means.

7. A toy having sound and optical effects, comprising:
 housing means simulating the appearance of a gun;
 visual display means for producing a visual image suggestive of a shell being fired by said gun;
 sound producing means mounted in said housing means for producing the sound effect of a shell firing;
 trigger means connected to said sound producing means for actuating said sound producing means to produce said sound effect when said trigger is squeezed;
 means defining an optical path for directly viewing an actual scene remote from said toy; and
 means for presenting said visual display in said optical path to appear superimposed on the image of an actual scene, toward which said optical path is aimed.

8. A toy as stated in claim 7 wherein said sound producing means includes a phonograph record having recorded thereon sounds which simulate shell-firing sounds.

9. A toy as stated in claim 7 wherein said housing means includes a barrel portion having visual display means provided thereon which simulates the flashing of a gun being fired.

10. A toy as stated in claim 7 wherein said superimposing means includes eye-piece means for aiming said toy at said actual scene and composite mirror means mounted in said eye-piece means for exhibiting said visual display to a user of said toy while simultaneously permitting said user to have an unobstructed view of said real scene.

11. A toy gun comprising:
 housing means including a simulated gun barrel, said gun barrel including an encompassing sidewall, said sidewall including a plurality of slots providing spaced openings in said sidewall;
 a tubular member reciprocably and rotatably mounted in said barrel, said tubular member including visual display means adapted to simulate a gun flash when said tubular member is reciprocated and rotated in such a manner that said visual display is visible through said slots in accordance with a predetermined pattern;
 sound producing means mounted in said housing means for producing a sound simulating the firing of a gun when said sound producing means is energized; and
 means connecting said sound producing means to said tubular member in such a manner that said connecting means moves said tubular member to bring said visual display into view through said slots when said sound producing means is energized.

12. A toy gun, comprising:
 housing means;
 means provided on said housing means for aiming said gun at an actual scene;
 composite mirror means mounted in said aiming means, said actual scene being visible through said composite mirror means;
 visual-display means reciprocably mounted in said housing means adjacent said composite mirror means, said visual-display means including a plurality of color patterns adapted to simulate rays being directed at said actual scene when reflected onto said composite mirror means in a predetermined manner;
 sound producing means mounted in said housing means for producing predetermined sounds simulating rays converging on said real scene;
 means mounted in said housing means for projecting said color patterns onto said composite mirror means in said predetermined manner; and
 power supply means connected to said sound producing means and to said visual-display means for sequentially moving said color patterns past said projecting means and simultaneously operating said sound producing means.

13. A toy gun as stated in claim 12 wherein said housing means includes a simulated gun barrel having an encompassing sidewall including elongated, spaced slots providing openings therein and wherein said gun includes a tubular member reciprocably and rotatably mounted in said barrel, said tubular member being provided with a predetermined visual display simulating said rays when viewed through said openings during rotation and reciprocation of said tubular member and means connecting said tubular member to said power supply means for reciprocating and rotating said tubular member simultaneously with the operation of said sound producing means and visual-display means.

14. A toy gun, comprising:
 housing means including a simulated gun barrel having an encompassing sidewall, said sidewall including a plurality of spaced slots providing openings therein, said encompassing sidewall also including an L-shaped slot having an axially extending portion and an upwardly extending portion;
 a tubular member reciprocably and rotatably mounted in said barrel, said tubular member including a pin engaging said L-shaped slot for controlling the movement of said tubular member within said barrel, said tubular member being provided with a visual-display observable through said openings in said barrel when said tubular member is reciprocated and simultaneously rotated by said L-shaped slot for simulating gun-shot flashs traveling along said barrel;
 phonograph record means rotatably mounted in said housing means, said phonograph record means having predetermined sound recorded thereon for simulating gun-shot sounds;
 driving gear means rotatably mounted in said housing means in driving engagement with said phonograph record means for imparting rotation thereto;
 rack means reciprocably mounted in said housing means in driving engagement with said driving gear means for imparting rotation thereto, said rack means being engageable with said tubular member to move it within said barrel when said rack means is reciprocated in one direction;
 power supply means connected to said rack means for reciprocating said rack means in one direction thereby imparting rotation to said phonograph record means;
 sound reproducing means mounted in said housing means in operative association with said phonograph record means for reproducing said predetermined sounds;
 a film carrier reciprocably mounted in said housing means, said film having a plurality of predetermined patterns provided thereon;
 means connecting said carrier to said tubular member for reciprocating said carrier in one direction when said tubular member is moved by said rack means;
composite mirror means provided in said housing means adjacent said carrier for superimposing said patterns on an actual scene viewable through said composite mirror means when said gun is aimed at said actual scene;
projecting means for projecting said patterns onto said composite mirror means in a predetermined sequence when said carrier is reciprocated in said one direction;
trigger means rotatably mounted in said housing means for controlling the operation of said driving gear means; and
a crank gear rotatably mounted in said housing means for rotating said driving gear means in such a manner that said rack means is moved in said housing means in a direction opposite to said one direction to store energy in said power supply means.

15. A toy gun as stated in claim 14 wherein said sound reproducing means includes a tone arm provided with a phonograph needle and a speaker cone having a portion biased into engagement with said tone arm to maintain said needle in contact with said phonograph record means and wherein said gun includes a reset lever pivotly mounted in said housing, said reset lever having a first end engageable by said crank gear when said crank gear is moved axially and another end engageable with said spring biased speaker cone portion to lift said speaker cone out of engagement with said tone arm when said crank means is rotated, and spring means connected to said tone arm for returning said tone arm to the beginning of said phonograph record means when said speaker cone is lifted out of engagement with said tone arm.

16. A toy gun as stated in claim 14 including spring means connected to said tubular member and to said carrier for retracting them after said rack means has moved them in said one direction and governor means connected to said carrier for slowing its return speed, whereby the projection of said patterns onto said composite mirror means is synchronized with the operation of said phonograph record means.

References Cited
UNITED STATES PATENTS

| | | | |
|---|---|---|---|
| 2,634,544 | 4/1953 | Belden | 46—175 |
| 2,684,554 | 7/1954 | Sigg | 46—175 |
| 2,984,042 | 5/1961 | Pearson | 46—13 |
| 3,023,541 | 3/1962 | Pelishek et al. | 46—175 |
| 3,218,745 | 11/1965 | Golden | 46—175 |
| 3,282,588 | 11/1966 | Ashmele | 46—175 |

LOUIS G. MANCENE, *Primary Examiner.*

R. F. CUTTING, *Assistant Examiner.*